US007091441B1

(12) United States Patent
Kuo

(10) Patent No.: US 7,091,441 B1

(45) Date of Patent: Aug. 15, 2006

(54) PORTABLE ARC-SEEDED MICROWAVE PLASMA TORCH

(75) Inventor: Spencer P. Kuo, River Edge, NJ (US)

(73) Assignee: Polytechnic University, Brooklyn, NY (US)

(*) Notice: Subject to any disclaimer, the term of this patent is extended or adjusted under 35 U.S.C. 154(b) by 98 days.

(21) Appl. No.: 10/804,601

(22) Filed: Mar. 19, 2004

(51) Int. Cl.
*B23K 10/00* (2006.01)

(52) U.S. Cl. ............................ 219/121.36; 219/121.59

(58) Field of Classification Search ........... 219/121.36, 219/121.54, 121.48, 121.43, 121.47, 121.57, 219/121.41, 121.5, 121.44, 121.52, 121.59; 427/577; 315/111.21, 111.41, 111.81; 204/298.37, 204/298.38; 156/345.41, 345.48; 118/723 MW, 118/723 MR, 723 I See application file for complete search history.

(56) References Cited

U.S. PATENT DOCUMENTS 4,275,287 A 6/1981 Hiratake
4,990,739 A 2/1991 Zaplatynsky et al.
5,036,176 A 7/1991 Yamaguchi et al.
5,144,110 A 9/1992 Marantz et al.
5,147,998 A 9/1992 Tsantrizos et al.
5,220,150 A 6/1993 Pfender et al.
5,538,765 A 7/1996 Kurihara et al.
5,847,355 A * 12/1998 Barmatz et al. ....... 219/121.59
5,938,950 A 8/1999 Gay et al.
6,163,009 A 12/2000 Hardwick et al.
6,329,628 B1 12/2001 Kuo et al.
6,388,225 B1 * 5/2002 Blum et al. ............ 219/121.48
6,614,000 B1 * 9/2003 Bessho et al. ......... 219/121.48

* cited by examiner

*Primary Examiner*—Quang Van
(74) *Attorney, Agent, or Firm*—Straub & Pokotylo; John C. Pokotylo

(57) ABSTRACT

Arc plasma torch generated by a torch module installed on the bottom wall in the narrow section of a tapered S-band rectangular cavity, is used to seed microwave discharge where the microwave electric field is maximum. This tapered cavity is designed to support $TE_{103}$ mode. With seeding, only low Q cavity and moderate microwave power (time average power of 700 W) are needed. The microwave-enhanced discharge increases the size, cycle energy, and duty cycle of the seeding arc-torch plasma considerably. This torch can be run stably without introducing gas flow or run just using airflow. Adding airflow can increase not only the size of the torch plasma but also its cycle energy, which may reach a plateau of about 12 J/per cycle for the airflow rate exceeding 0.393 l/s. This microwave plasma torch may have a radius of about 1.25 cm or more, a height of about 5 cm, and a peak electron density exceeding $5\times10^{13}$ $cm^{-3}$. This torch may produce an abundance of reactive atomic oxygen, and therefore may be used in applications for rapidly destroying a broad spectrum of chemical and biological warfare (CBW) agents.

47 Claims, 11 Drawing Sheets

100

PORTABLE ARC-SEEDED MICROWAVE PLASMA TORCH

§ 0. GOVERNMENT FUNDING

This invention was made with Government support and the Government may have certain rights in the invention as provided for by grant number AFOSR-F49620-01-1-0392 by the Air Force Office of Scientific Research (AFOSR).

§ 1. BACKGROUND OF THE INVENTION

§ 1.1 Field of the Invention

The present invention generally concerns atmospheric pressure plasma generation devices (or "plasma sources"). In addition, the present invention also concerns applications for this microwave plasma torch as well as the feasibility of enlarging the device for generating multiple torches simultaneously.

§ 1.2 Background

Atmospheric pressure plasma sources may be used in applications requiring plasmas to be exposed directly to the open air. The applications include spray coating and materials synthesis (See, e.g., the articles: M. I. Boulos et al., "Thermal Plasma Fundamentals and Applications," Vol. 1, Plenum Press, 1994, pp. 33–47 and 403–418 (hereafter referred to as "the Boulos article"); and "Thermal Plasma Torches and Technologies," Vol. 1, O. P. Solonenko, Ed., Cambridge: Cambridge Int. Sci. Publ., 2001 (hereafter referred to as "the Solonenko article").), microwave reflector/absorber (See, e.g., the articles: R. J. Vidmar, "On the use of atmospheric pressure plasmas as electromagnetic reflectors and absorbers," *IEEE Trans. Plasma Sci.*, Vol. 18, pp. 733–741, 1990 (hereafter referred to as "the Vidmar article"); and E. Koretzky and S. P. Kuo, "Characterization of an atmospheric pressure plasma generated by a plasma torch array," *Phys. Plasmas*, Vol. 5, pp. 3774–3780, 1998 (hereafter referred to as "the Koretzky article").), shock wave mitigation for sonic boom and wave drag reductions in supersonic flights (See, e.g., the articles: V. P. Gordeev et al., "Plasma technology for reduction of flying vehicle drag," *Fluid Dynamics*, Vol. 31, pp. 313–317, 1996 (hereafter referred to as "the Gordeev article"); S. P. Kuo et al., "Observation of shock wave elimination by a plasma in a Mach-2.5 flow," *Phys. Plasmas*, Vol. 7, pp. 1345–1348, 2000 (hereafter referred to as "the Kuo article"); and Daniel Bivolaru and S. P. Kuo, "Observation of supersonic wave mitigation by plasma aero-spike," *Phys. Plasmas*, vol. 9, 721–723, 2002 (hereafter referred to as "the Bivolaru article").), and sterilization and chemical neutralization (See, e.g., the articles: M. Laroussi, "Sterilization of contaminated matter with an atmosphere pressure plasma," *IEEE Trans. Plasma Sci.*, Vol. 24, pp. 1188–1191, 1996 (hereafter referred to as "the Laroussi article"); J. R. Roth et al., "A remote exposure reactor (RER) for plasma processing and sterilization by plasma active species at one atmosphere," *IEEE Trans. Plasma Sci.*, Vol. 28, pp. 56–63, 2000 (hereafter referred to as "the Roth article"); and H. W. Herrmann et al., "Decontamination of chemical and biological warfare (CBW) agents using an atmospheric pressure plasma jet (APPJ)," *Phys. Plasma*, Vol. 6, pp. 2284–2289, 1999 (hereafter referred to as "the Herrmann article").).

Different applications have different requirements on the plasma parameters, such as its density, temperature, volume and flow rate. For spray coating application, a plasma jet is used for heating and acceleration of particles injected into the jet. Thus a high enthalpy jet having large plasma flow rate and density is desirable. Dense, uniform, low temperature, and large volume plasma is desirable for microwave reflector/absorber applications. Used for decontamination of chemical and biological warfare (CBW) agents, a plasma source is aimed at producing chemically active species, such as molecular oxygen in metastable states and atomic oxygen. These reactive species are capable of rapidly destroying a broad spectrum of CBW agents. Some of the applications also favor that the sources can be easily transported.

Dense atmospheric-pressure plasma can be produced through dc/low frequency capacitive or high frequency inductive arc discharges. This technique requires adding gas flows to stabilize the discharges and to carry the generated plasmas out of the discharge regions to form torches. The inductive torch (See, e.g., the article: T. B. Reed, "Induction-coupled plasma torch", *J. Appl. Phys.*, Vol. 32, pp. 821–824, 1961 (hereafter referred to as "the Reed article").) and non-transferred dc torch (See, e.g., "the Boulos article" and M. Zhukov, "Linear direct current plasma torches", *Thermal Plasma and New Material Technology, Vol. 1: Investigations of Thermal Plasma Generators*, O. Solonenko and M. Zhukov, Ed. Cambridge Interscience Publishing, pp. 9–43, 1994, (hereafter referred to as "the Zhukov article").) employ high current power supply and require very high gas flow rate to achieve stable operation. Consequently, the structures of these torches are relatively large and are therefore unsuitable for certain applications.

Torch modules such as those described in the article S. P. Kuo, et al., "Design and electrical characteristics of a modular plasma torch," *IEEE Trans. Plasma Sci.*, vol. 27, no. 3, pp. 752–758, 1999; and U.S. Pat. No. 6,329,628 titled "Methods and Apparatus for Generating a Plasma Torch," ("the '628 patent") can be run in dc or low frequency ac mode and can produce low power (hundreds of watts) or high power (a few kW in 60-Hz periodic mode or hundreds of kW in pulsed mode) torch plasmas. However, the size of the torch plasma produced by such modules may be limited by the gap between the electrodes and may depend strongly on the gas flow rate.

In view of the foregoing deficiencies of known plasma torches, there is a need for a plasma source that is portable and that can generate a stable and sizable plasma torch independent of the gas flow rate.

§ 2. SUMMARY OF THE INVENTION

Embodiments consistent with the present invention meet the aforementioned goals by providing a seeded microwave torch employing a tapered rectangular cavity and moderate microwave power (e.g., time average power of 700 W). A torch module such as one of those described in the '628 patent may be used to generate the seeding plasma, which initiates and controls the location of microwave discharge. With seeding, a low Q cavity (e.g., with a value less than 30) can be used. Thus, a relatively large exit opening on a cavity wall can be used to increase the diameter of the torch. Although the Q-factor of the cavity is reduced, the evanescent microwave electric field can also reach farther out of the cavity opening. Therefore, this new type arc/microwave hybrid plasma torch does not need gas flow in its operation and yet can produce sizable plasma outside the cavity. Although gas flow is not required, the torch module is flexible in that gas flow may be introduced to its operation. Gas flow can increase the size as well as the energy of the torch plasma. The whole system can be integrated into a portable unit, which permits it to be used in many applications requiring the plasma sources to be easily transported.

The components of an exemplary plasma torch consistent with the present invention may include 1) a microwave source, (e.g., a magnetron) 2) a tapered microwave cavity, 3) a torch module, and 4) a power supply to run the torch module and magnetron. This microwave plasma torch may have a radius of about 1.25 cm or more, a height of about 5 cm, and a peak electron density exceeding $5\times10^{13}$ $cm^{-3}$. This plasma source can easily and quickly start the plasma generation.

A plasma torch device consistent with of the present invention may be easily expanded to an array of torches. This may be done by increasing the length of a narrow section of the cavity and adding, at a quarter wavelength apart, exit opening-torch module pairs on the top and bottom walls of the cavity, respectively. The available microwave power is increased proportionally.

The present invention is attractive because at least some embodiments consistent with the present invention can use electrical circuitry that is simple and is adaptable to a number of AC power sources, such as 60 Hz (or 50 Hz) voltage available at most common wall outlets. In some embodiments consistent with the present invention, such as in aircraft applications, a 400 Hz AC power source may be used. This plasma source can run continuously without needing water-cooling and can produce a plasma torch having its cycle energy (in 60 Hz) exceeding 10 J/per cycle, which is large enough for many applications.

The present invention is attractive also because at least some embodiments consistent with the present invention produce an abundance of reactive atomic oxygen, which may be used in applications for rapidly destroying a broad spectrum of chemical and biological warfare (CBW) agents.

In addition, microwave plasma torches, in accordance with the present invention may be used in applications for absorbing radar pulses, e.g., microwave plasma torches arranged in an array on the surface of an aircraft may be used for evading radar detection.

In some embodiments, the tapered microwave cavity is formed by tapering a section of a rectangular waveguide and terminating two ends of the waveguide with conducting plates. In such an embodiment, using a tapered rectangular cavity, the dimensions of the cavity may be varied, as long as the cavity supports a $TE_{10n}$ mode at the selected microwave source frequency, where n is a positive integer $\geqq 3$.

In some embodiments consistent with the present invention, the height of the narrow section of the cavity is small, e.g., as small as 5 mm, the two ends of the taper section are located at electric field minimum locations of the $TE_{10n}$ mode selected, and the openings in the narrow section to host the torch module and to exit the arc/microwave plasma are located at field maximum locations of the $TE_{10n}$ mode.

In some embodiments, the length of the narrow section of the cavity is $m\lambda_z/2$, where $\lambda_z$ is the wavelength of the $TE_{10n}$ mode in the axial direction of the cavity, and m is an integer determined by the number of torches to be hosted.

§ 3. BRIEF DESCRIPTION OF THE DRAWINGS

Figure 9:
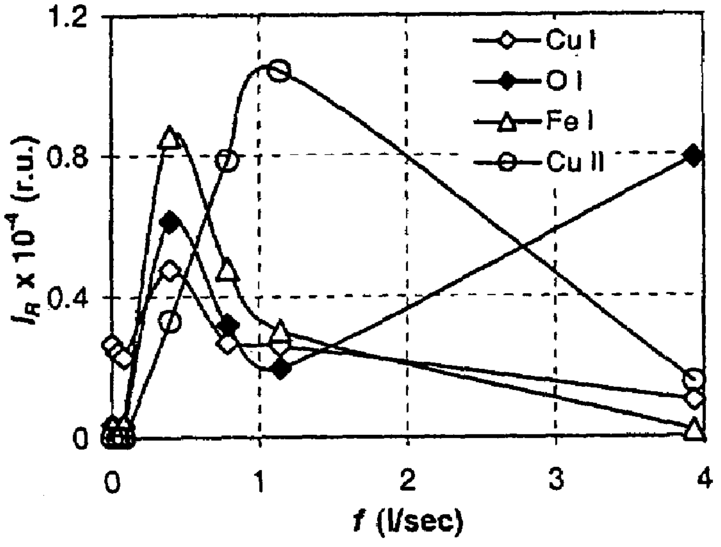

FIG. 9 includes plots of the dependency of intensity on the air-flow rate f of relative intensities $I_R$ of spectral lines—Fe I (385.991 nm), Cu I (809.263 nm), Cu II (766.47 nm), and O I (777.194 nm) at the location approximately 1" (2.5 cm) away from the nozzle exit of the torch module.

Figure 10:
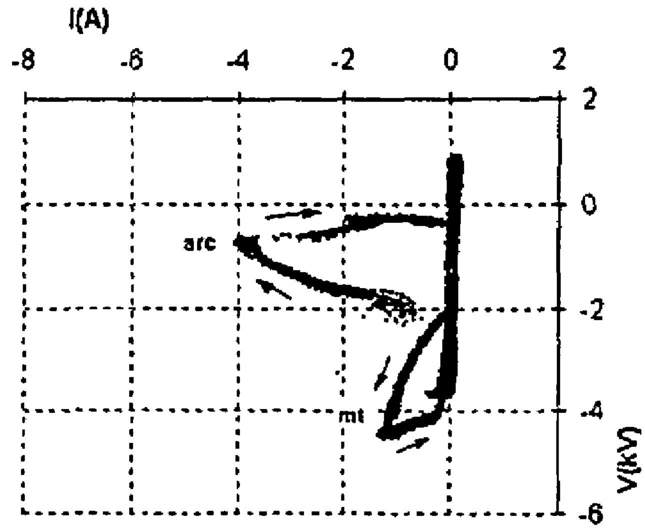

FIG. 10 is a plot of V-I characteristics of an arc discharge and magnetron input.

Figure 11:
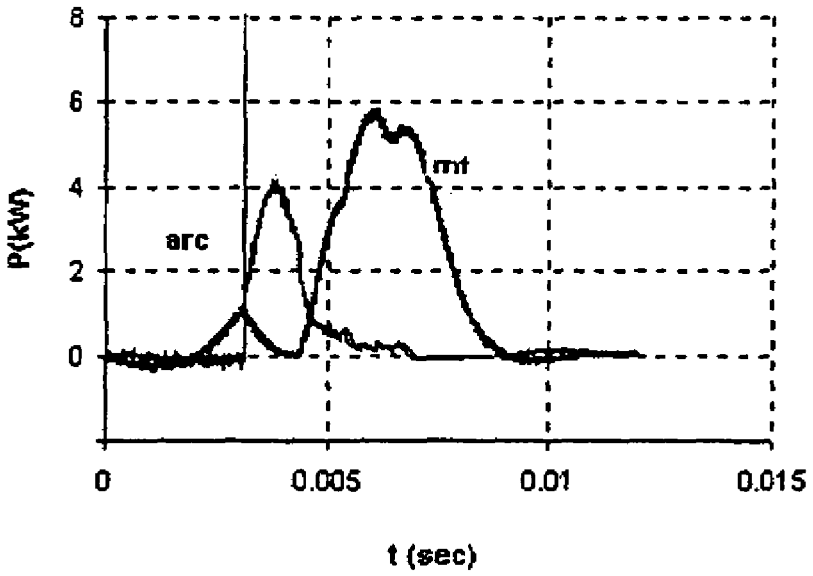

FIG. 11 is a plot of power functions of the arc discharge and magnetron input.

Figure 12:
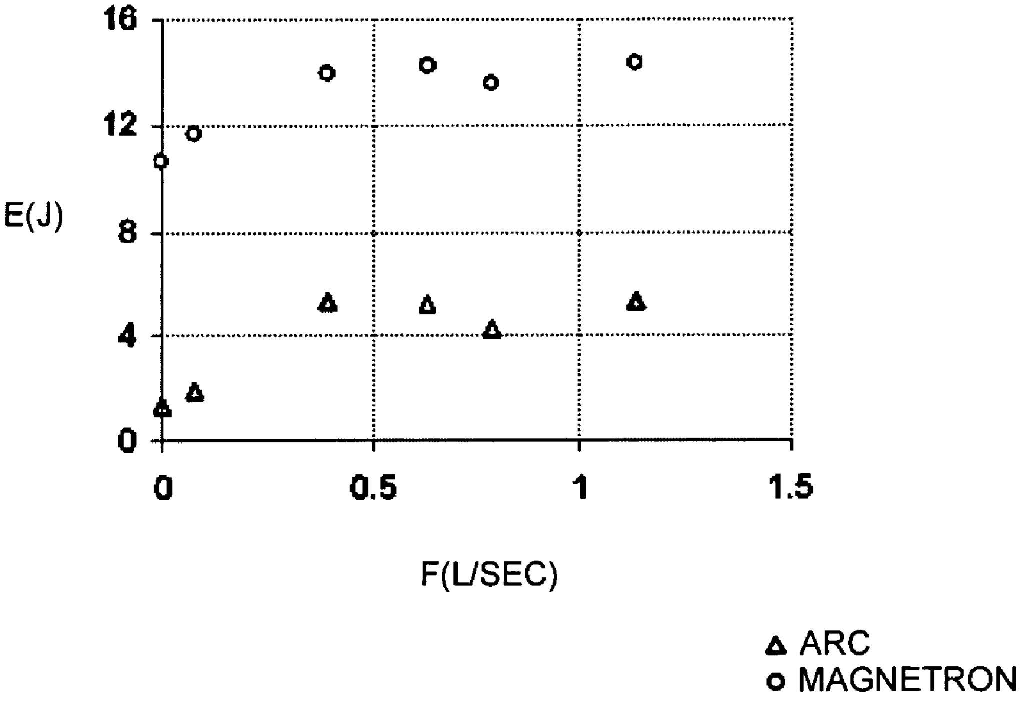

FIG. 12 is a plot of dependency of cycle energies of an arc discharge and magnetron input on gas flow rate f.

§ 4. DETAILED DESCRIPTION

The present invention involves novel methods and apparatus for generating a microwave plasma torch. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

In the following, functions, which may be performed by the present invention, are introduced in § 4.1. Then, structures of the apparatus built in accordance with the present invention are described in § 4.2. Thereafter, operations of the apparatus are described in § 4.3. Finally, conclusions about the present invention are presented in § 4.4.

§ 4.1 Functions

The present invention may be used to generate a microwave plasma torch having a relatively large size (e.g., at least 5 cm height and at least 2 cm wide) and a relatively high density (e.g., at least $10^{13}$ electrons/$cm^3$). The present invention may also be used to generate a plasma torch that does not need a gas flow for its operation and having enhanced enthalpy and stability. The present invention may be considered as a unit of a microwave plasma torch and several units in an array may be installed in a single cavity with prolonged narrow section to host all units. The present invention may use one or more units of microwave plasma torches in applications for spray coating and materials synthesis, for decontamination of CBW agents, and for absorbing radiation (e.g., radar).

§ 4.2 Structures

In the following, a new portable microwave plasma torch is described in § 4.2.1. Thereafter, systems with one or more units of the microwave plasma torches described in § 4.2.1 are described in § 4.2.2.

§ 4.2.1 A Portable Arc-Seeded Microwave Plasma Torch

Figure 1:
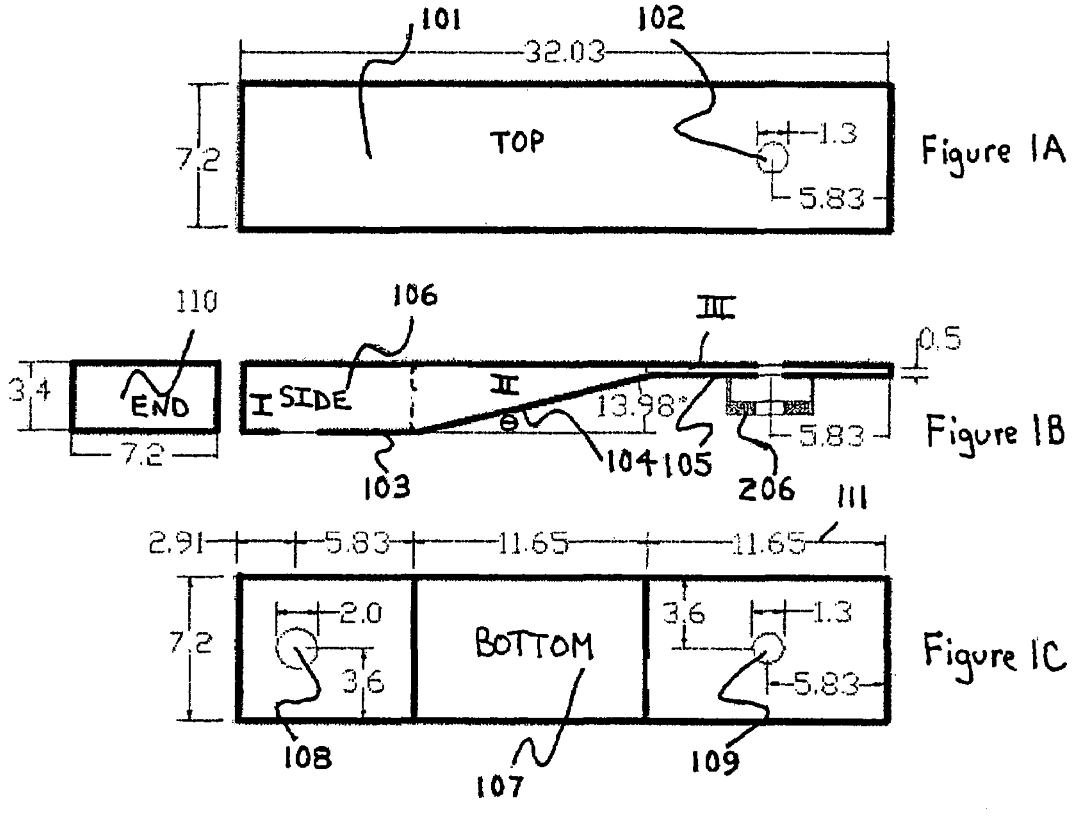
FIGS. 1A–1C are schematic drawings of the top view, side view and bottom view, respectively, of a tapered cavity made in accordance with the present invention.

A new hybrid arc/microwave torch will be described with reference to FIGS. 1A–1C. The tapered cavity of the torch device may be constructed in accordance with the dimensions described below.

The end cross section (110) of the un-tapered section (106) may be the same as that of a standard S-band (WR-284) waveguide. (e.g., ~7.2 cm×3.4 cm). The S-band rectangular waveguide is tapered to a smaller cross section (e.g., 7.2 cm×0.5 cm). The two sides of the waveguide (100) are terminated by conducting plates to form a cavity. This cavity includes three sections. Sections I (106) and III (105) on the two sides of the waveguide (100) have uniform cross sections. The wider section I (106) may have a length (103) of $3\lambda_z/8$ (e.g., ~8.74 cm) and the narrow section III (105) may have a length (111) of $\lambda_z/2$ (e.g., ~11.65 cm). The tapered middle transition section II (104) may have the same width as the adjoining sections (e.g., ~7.2 cm), may have a height ranging from ~3.4 cm to ~0.5 cm, may have a length of $\lambda_z/2$ (e.g., ~11.65 cm) and a slope angle $\theta \cong \tan^{-1}(2.9/11.65) \cong 14^0$.

Microwave generated by a magnetron (e.g., 2.45 GHz, 700 W) radiates into this cavity at opening (108). The opening (108) may be located at about quarter wavelength ($\lambda_0/4$) (more precisely, $\lambda_z/8$) away from the open-end of section I of the cavity. Thus, if $\lambda_0$=12.25 cm is the free space wavelength and $\lambda_z=\lambda_0/[1-(\lambda_0/2a)^2]^{1/2}$=23.3 cm is the axial wavelength for the $TE_{103}$ mode, and if a=7.2 cm is the dimension of the wider side of the cross section, the quarter wavelength in the axial direction of the cavity may be 5.83 cm and the total axial length of the cavity may be 32 cm$\cong 1.5\lambda_z$.

At the maximum wave electric field location in the narrow section III (105) of the cavity, which may be $\lambda_z/4$=5.83 cm away from its shorted-end, two aligned openings (109 and 102) on the bottom (107) and top (101) walls, respectively, are introduced. Both openings have the same diameter of 1.3 cm.

A gas plenum chamber (206), such as those described below, is aligned to the openings (109 and 102) and attached (e.g., welded) to the bottom wall (107) of the narrow section III (105) of the cavity (100). Gas plenum chamber (206) is used to feed the gas flow through as well as to host the torch module generating the seeding plasma.

Figure 2A:
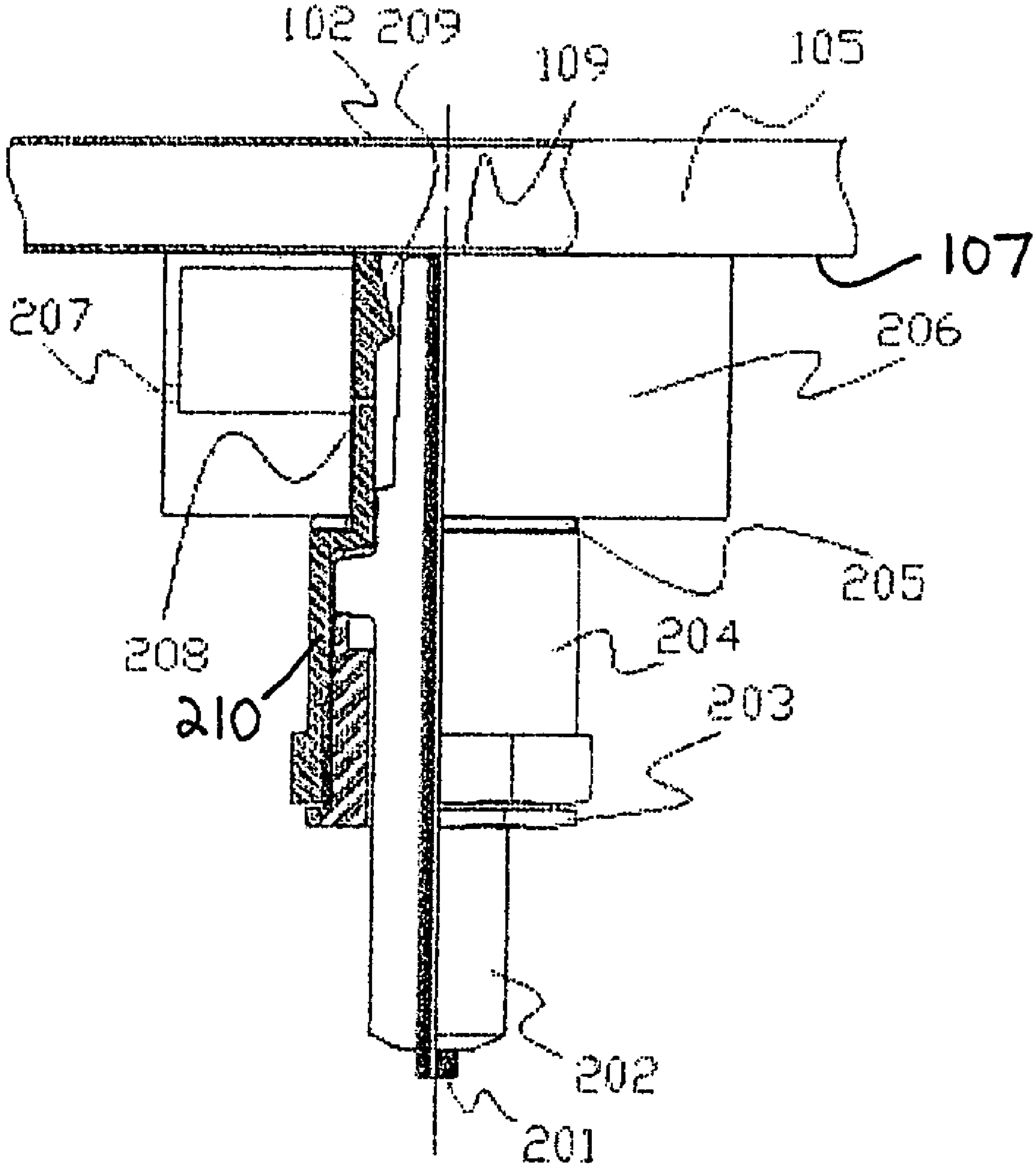
FIG. 2A is a schematic drawing of an arrangement showing a torch module plugged through the plenum chamber to the bottom opening in the taper section of a cavity.
Figure 2B:
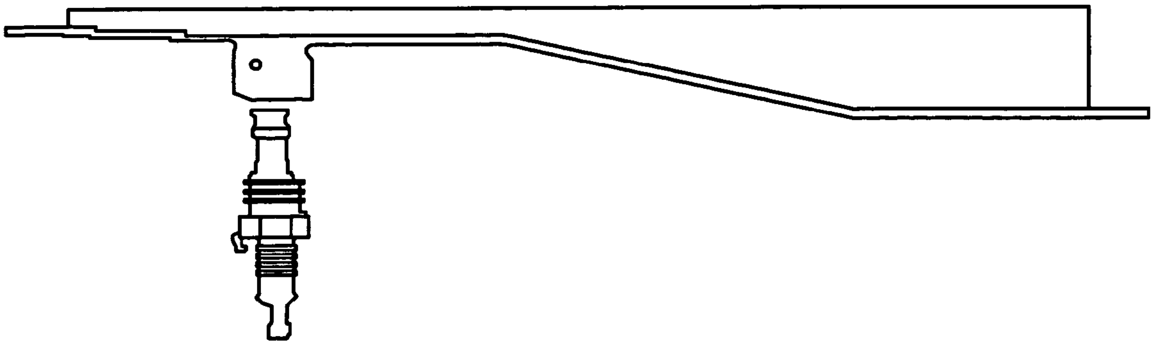
FIG. 2B is a photograph showing a torch module to be plugged into a cavity.

Referring to FIG. 2A, a torch module (204), such as those described in detail in the Kuo article or the '628 patent, is then screwed into this plenum chamber (206) to the bottom opening (109), as shown schematically in FIG. 2A (only part of the narrow section III (105) of the cavity is shown). The top opening (102) allows the plasma to stream out of the cavity. As further shown in FIG. 2A, the plenum chamber (206) may include a gas inlet port (207), and the torch module (204) may include openings (208) on the frame (210) of the torch module to fluidly couple the gas plenum chamber (206) with the annular gas chamber (209) of the module, a (e.g., tungsten) central electrode (201), a (e.g., ceramic) insulator (202), a sealing washer (205), and a holder (203) to hold the insulator to the frame (210) of the module. The upper corner of the transition section may be set at $\lambda_z/2$ away from the shorted-end of the narrow section III to prevent the possibility of microwave discharge at that location. Using half wavelength as the transition length of the taper minimizes the impact of nonuniformity on the cavity mode. FIG. 2B is a photograph (250) showing a torch module to be plugged into a cavity.

Figure 3:
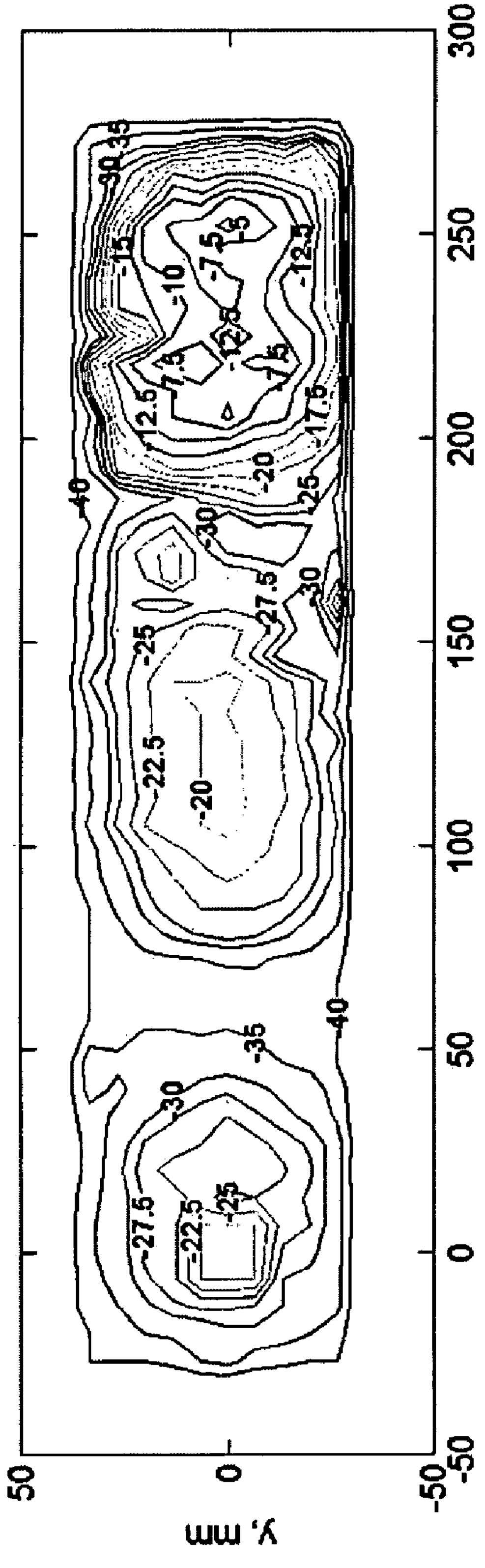
FIG. 3 is a microwave electric field distribution measured on the bottom wall of a cavity.

FIG. 3 illustrates a spatial distribution of the microwave electric field normal to the bottom wall of a cavity as measured by a small monopole antenna. The antenna was made of an insulated wire of 1 mm diameter and 4 mm long, which was connected to the central line of a 50Ω coaxial line. To carry out the measurements, the bottom wall of the cavity was replaced by a perforated screen having uniform distributed openings of 2 mm diameter and separated by about 6.7 mm. Thus, the antenna could be inserted into the cavity through the openings of the screen wall. It measured the electric field component perpendicular to the wall, which is the electric field direction of interest and is also the anticipated field direction of the $TE_{103}$ mode. A spectrum analyzer recorded the signal collected by the antenna. As shown, the field intensity at the designated torch location is enhanced by about 15 dB (i.e., from ~−22.5 to ~−7.5).

Figure 4:
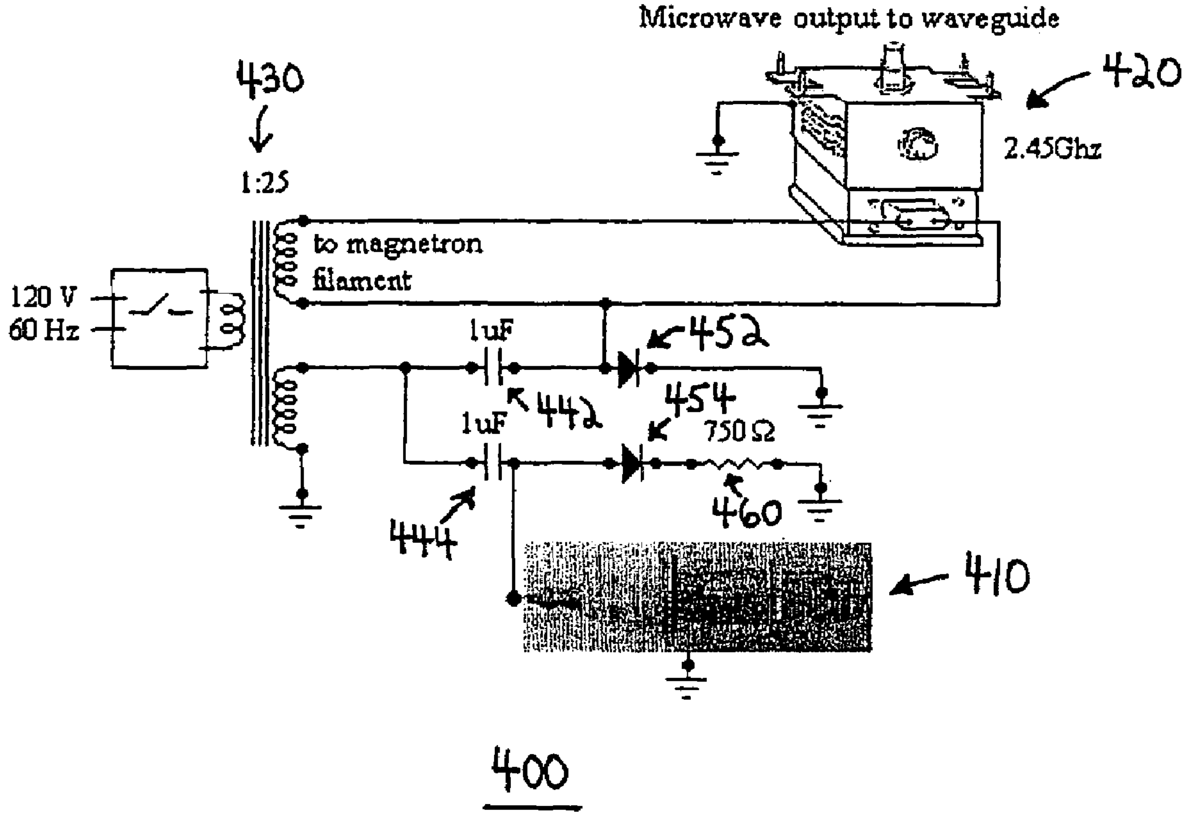
FIG. 4 is a circuit diagram of the power supply of the torch device.

FIG. 4 is a schematic of a power supply and electric circuit (400) that may be used in the torch device to light the torch module (410) and to run the magnetron (420) simultaneously. A single power transformer (430) (e.g., with a turns ratio of 1:25) may be used to step up the 60-Hz line voltage of 120 V (rms) to 3 kV (rms), which is applied to both devices (410 and 420) through serially connected two 1 μF capacitors (442, 444), one for each device. The magnetron (420) is then connected in parallel with a diode (e.g., 15 kV and 750 mA rating) (452) which eliminates the undesirable ohmic loss by preventing negative voltage to be applied between anode and cathode. Although the torch module (410) can be run without diode (454) to generate torch plasma in both half cycles, in the illustrated embodiment it (410) is connected in parallel to serially connected diode (454) and resistor (e.g., 750Ω) (460) so that it is lit only when microwave is available. This added circuit also increases the voltage applied to the torch module (410) when the diode (454) is reverse biased. This makes it easy to initiate the discharge without increasing the turns ratio of the transformer (430). The discharge evolves quickly to a high current/low voltage diffused-arc mode. The series resistor (460) added in the circuit of the torch module (410) may be used to protect the diode (454) when it is forward biased, by preventing the charging current of the capacitor (444) from exceeding the specification of the diode (454). A reduction of the capacitor charging during this period also delays the arc discharge. This may be necessary if the magnetron (420) has a higher starting voltage, which will often be the case. The optimal operation condition is when the discharge pulse and microwave pulse overlap each other. Since the discharge pulse may likely be shorter than the microwave pulse and since the microwave field may likely be too low to initiate discharge by itself, it may be desirable to have the arc discharge produce seeding charges right at the beginning of the microwave pulse. The microwave electric field may be parallel to the torch column. In this case, it is effective in moving the torch plasma out of the cavity and enhancing its height.

Figure 5A:
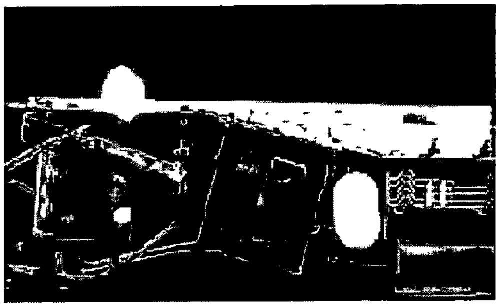
FIGS. 5A to 5C are photos of three microwave torches, one without flow, another with very low airflow (e.g., 1.133 l/s), and a third with a large exit opening and airflow rate, generated by a torch device.
Figure 5B:
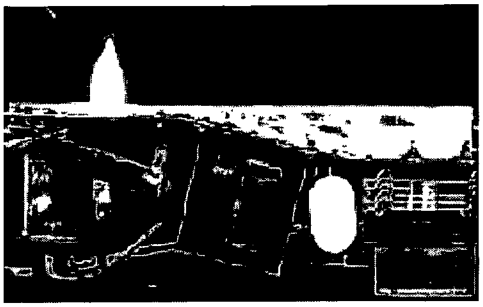
Figure 5C:
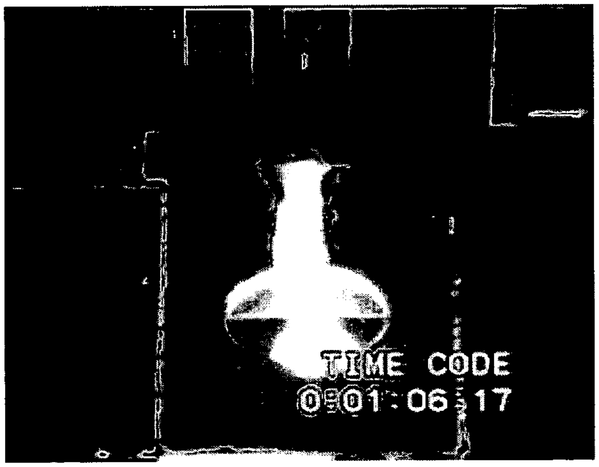

This torch may be operated without applying a gas flow to stabilize the arc discharge and a large portion of microwave plasma may still be generated outside the cavity. FIG. 5A is a photo of a torch generated under a no gas flow condition. As shown, a sizable torch plasma (height of about 1.5 cm and a volume of about 3.5 cc) outside of the cavity is generated. FIG. 5B is a photo of an enlarged torch that results when a very small airflow (about 1.133 l/s) is introduced through the torch module. As shown, such a small airflow can significantly increase the height (to about 3.5 cm) and the volume (to about 8 cc) of the torch plasma. The size of this microwave torch plasma increases with the flow rate, microwave power, and the diameter of the exit opening on the cavity wall. FIG. 5C shows that the torch plasma may achieve a height more than 6 cm outside the cavity by simply increasing the diameter of the exit opening to 2.5 cm. However, the microwave leakage may also exceed the standard safety level of 5 $mW/cm^2$, which may be undesirable for some applications.

The tapered rectangular cavity used in this torch device needs a special design consideration. Other parts may be constructed using components from available spark plugs for the torch module (See, e.g., "the Kuo article and patent"), from available microwave oven for the magnetron, transformer, diodes, and capacitors.

Having described a portable setup of an exemplary microwave plasma torch, a second setup having more than one unit of microwave plasma torches is now described in § 4.2.2 below.

§ 4.2.2 Systems with One or More Arc-Seeded Microwave Plasma Torches

Figures 6, 6A, 6B:
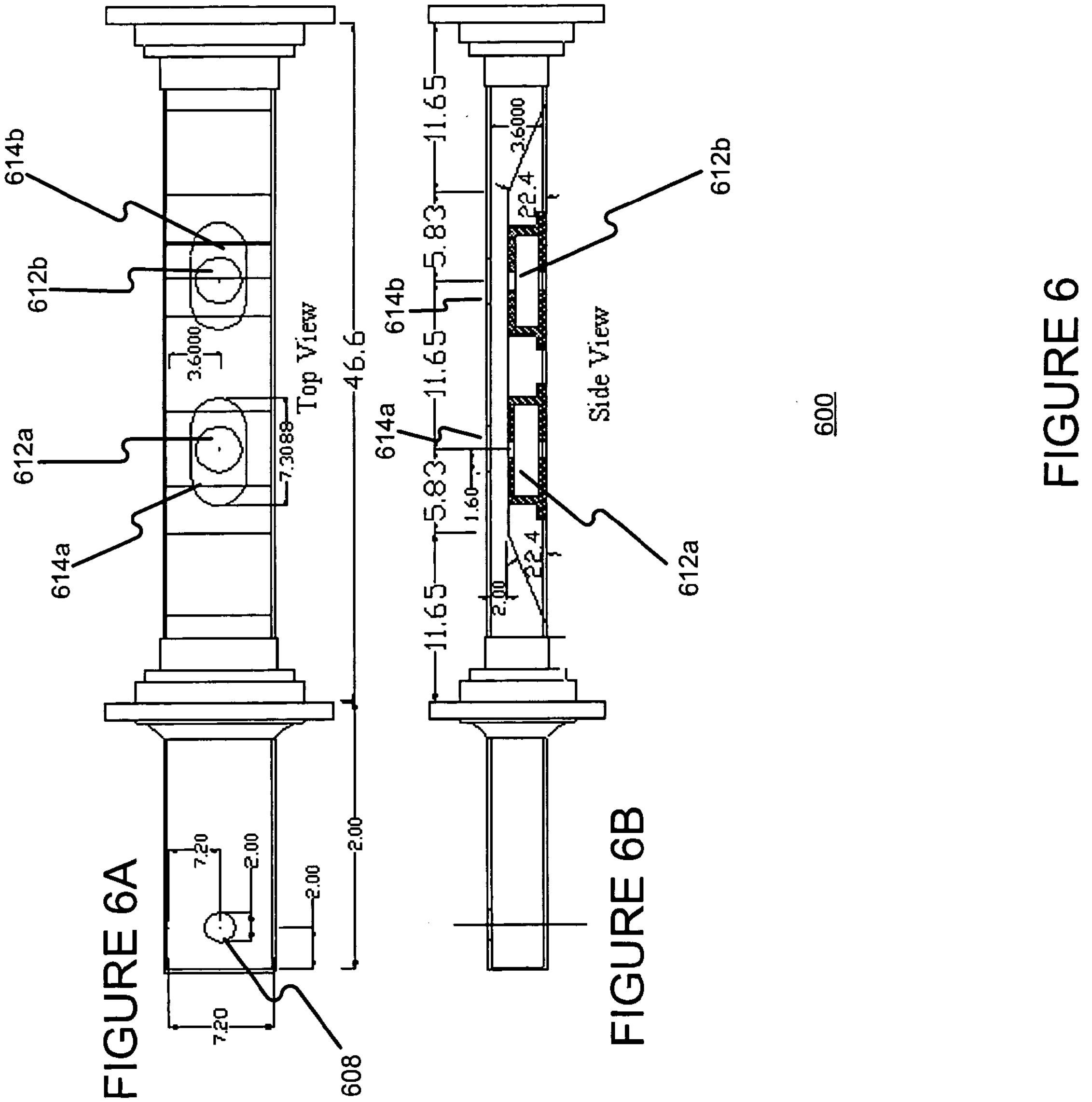
FIGS. 6A and 6B are schematic drawings of the top view and side view, respectively, of a prolonged tapered cavity, which hosts two torches.
Figure 7A:
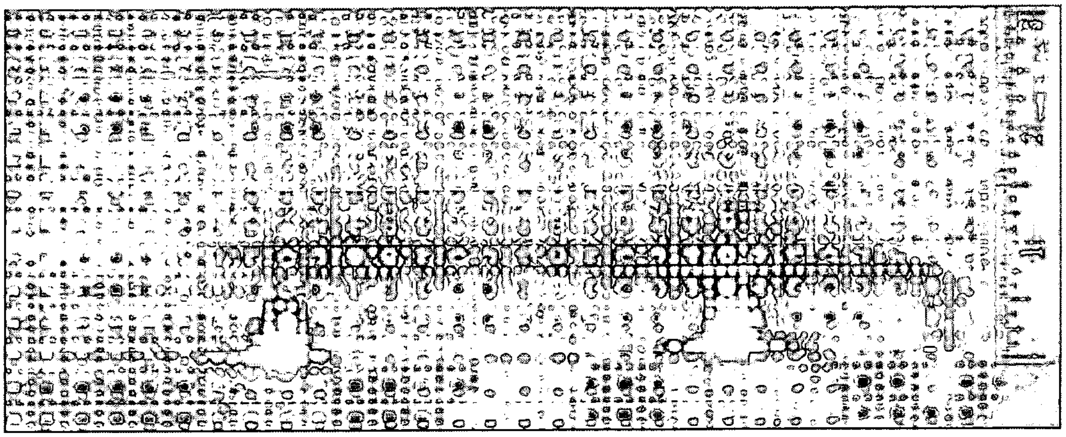
FIGS. 7A and 7B are images of two seeding plasma torches generated simultaneously by two torch modules placed at the bottom wall of the prolonged narrow section of a rectangular tapered cavity, and two microwave plasma torches generated simultaneously by this enlarged invented torch device, respectively.
Figure 7B:
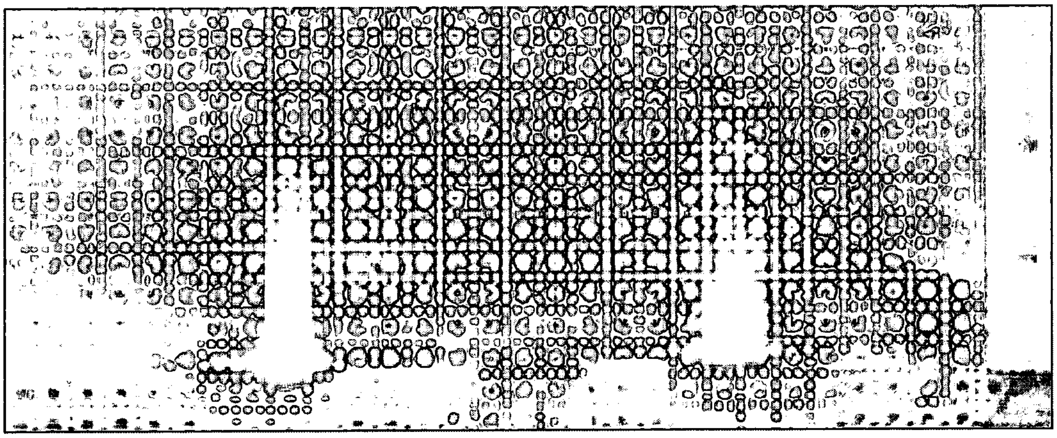

FIGS. 6A and 6B are schematic drawings of a top view and a side view, respectively, of a cavity 600 that can host two torches. The units of the dimensions shown in FIGS. 6A and 6B is in centimeter (cm). The cavity 600 may be constructed in accordance with the exemplary dimensions provided below. Two pairs of aligned openings 612, 614 are introduced on the top and bottom walls in the narrow section II of the cavity. The diameters of the openings on the top wall 614 *a, b* (e.g., about 2.5 cm) may be larger than those 612 *a*, b (about 1.3 cm) of the bottom wall. Two torch modules (not shown) may be attached to the cavity through the bottom openings 612 *a*, b and the produced torch plasmas may exit the cavity through the two top openings 614 *a*, b. Two separate power supplies (e.g., such as the one shown in FIG. 4) maybe used to run the torch modules. Thus the arc discharges can simultaneously synchronize with the 60 Hz microwave pulse, introduced through opening 608, generated by a magnetron which is run by an identical power supply also shown in FIG. 4. FIG. 7A is a photo of two arc torches generated by a device, made in accordance with the schematic drawing in FIG. 6, in the absence of microwave. The portion of the torches inside the cavity is 1 cm, which is the height of the narrow section of this cavity. Thus each arc torch has a height of about 2.5 cm, which is small because the backpressure of the module is only about 1.2 atm. FIG. 7B illustrates the generation of two microwave torches, (i.e., magnetron is switched on) by this device. The height of each microwave torch increases considerably to more than 7 cm. The applied (time averaged) microwave power is about 1.4 kW.

The narrow section of the cavity can be easily extended to host more than one torch. A large volume atmospheric pressure plasma can thus be generated. It can be used to absorb radiation (and therefore provide a cloaking feature) and to decontaminate CBW agents.

The operations of the systems described in this section will be described in § 4.3 below. First, however, a number of applications of these systems are described in § 4.2.3 below.

§ 4.2.3 Exemplary Applications of System

There are a number of potential applications from an arrangement of one or more microwave plasma torches. As described in § 4.2.3.1 below, a system made in accordance with the present invention, such as those described in § 4.2.1, may be used to generate plasma jet carrying reactive species such as atomic oxygen. Such as a plasma jet may be used to decontaminate chemical and biological warfare (CBW) agents. As described in § 4.2.3.2 below, a system including an array of microwave plasma torches, made in accordance with the present invention, such as those described in § 4.2.2, may be used to absorb radiation for radar cloaking. This application may be applied to systems aboard an aircraft, such as a military aircraft for example.

§ 4.2.3.1 Decontamination of CBW Agents

The emission spectroscopy of the microwave plasma torch generated by the embodiment of the present invention described in § 4.2.1 was analyzed to deduce the information on the electron density distribution and composition of torch species. Electron density was evaluated from the Stark broadening of $H_\beta$ at 486.133 nm and $H_\alpha$ at 656.279 nm. The radial distribution of electron density $N_e(r)$ in the region close to the cavity wall is presented in FIG. 8. Electrons in this region close to the cavity wall were shown to distribute quite uniformly across the core of the torch with a peak (in time) density of about $6\times10^{13}$ $cm^{-3}$ in the center and of about $7\times10^{13}$ $cm^{-3}$ in the boundary layer, which is about 5 mm from the center. FIG. 9 shows the dependence on the air-flow rate f of relative intensities of spectral lines—Fe I (385.991 nm), Cu I (809.263 nm), Cu II (766.47 nm), and O I (777.194 nm)—at boundary layers of the torch, approximately 25 mm away from the nozzle exit of the torch module (i.e., about 20 mm away from the cavity wall). Four flow rate dependent regimes of the torch operation can be easily distinguished. First is the very low flow-rate regime characterized by low excitation and low oxygen content. Second is the low flow rate regime characterized by rapid increase of excitation and relatively high oxygen content. Third is the moderate flow rate regime characterized by increasing excitation of ion lines, and decreasing excitation of atomic lines including oxygen. Fourth is relatively high flow rate regime characterized by atomic oxygen lines dominating the emission spectrum. The reactive atomic oxygen has been shown to be capable of rapidly destroying a broad spectrum of CBW agents.

The present invention is portable and operates stably with all-air discharge, which are the advantageous features for decontamination applications.

§ 4.2.3.2 Absorbing Radiation for Radar Cloaking

Figure 8:
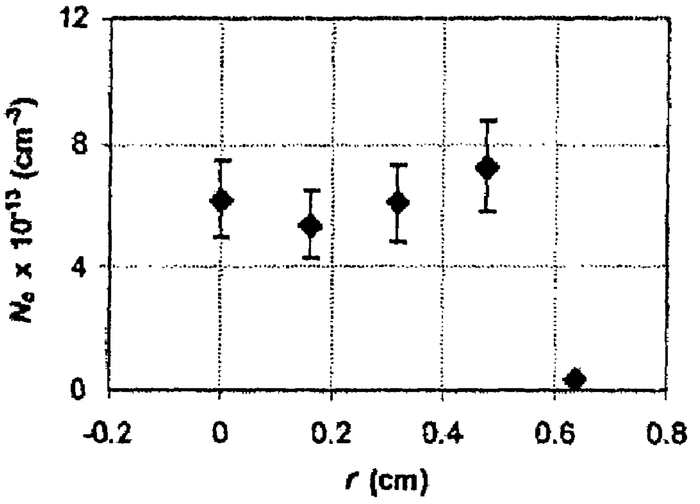
FIG. 8 is the radial distribution of the electron density $N_e(r)$ near a cavity wall, determined by the emission spectroscopy of a torch.

A plasma torch generated by a torch module such as those described in the Kuo article and the '628 patent can have a plasma density of $10^{13}$ $electrons/cm^3$ and can attenuate 10 GHz CW microwave by more than 10 dB. The size of each torch is enlarged considerably when microwave is added as shown in FIG. 7B. Moreover, the electron density of the microwave plasma torch, as presented in FIG. 8 is much higher than that of the arc torch generated by the torch module alone and the absorbing rate of air plasma on radar pulse increases linearly with the electron density. Thus the microwave plasma torch generated by the present invention may be used to improve the effectiveness of radiation absorption considerably. Moreover, devices consistent with the present invention can be run stably with very low gas flow rate and yet can produce a torch with a size larger than that of an arc torch. The microwave plasma torches can also be arranged in an array on the surface of an aircraft for evading radar detection (also referred to as "cloaking").

§ 4.3 Operations of an Exemplary Embodiment

Operations of an exemplary arc-seeded microwave plasma torch such as those described in § 4.2.1 above, are described in § 4.3.1 below. Operations of an exemplary system generating two (or more) microwave torches simultaneously, such as those described in § 4.2.2 above, are described in § 4.3.2 below.

§ 4.3.1 Operations of an Exemplary Arc-Seeded Microwave Plasma Torch

The operation of an exemplary microwave torch involves the operation of the torch module and the operation of the magnetron. Both components may be run at a 60 Hz periodic mode. The circuit arrangement shown in FIG. 4 keeps the arc discharge in synch with the microwave discharge in each cycle. The resistor 460 of 750Ω in the circuit may be chosen to achieve an optimal operating condition in which the arc discharge pulse overlaps with the microwave pulse and also starts right at the beginning of the microwave pulse.

Two digital oscilloscopes provided four channels to simultaneously measure the time varying voltages and currents of the arc discharge of the torch module and of the magnetron. The V-I characteristics and power functions of the arc discharge and magnetron input in the case of gas flow rate at 1.133 l/s are presented in FIGS. 10 and 11, respectively. As shown in FIG. 10, the breakdown voltage of the arc discharge is about 3.5 kV and the peak arc current is about 4 A. The magnetron has a starting voltage of about 4 kV and an operating current of about 1 A. As indicated by the power functions in FIG. 11, the magnetron starts operation before the arc discharge. However, microwave generation is disrupted by the appearance of the arc discharge and restarts right after the peak of the arc discharge. This disruption on the operation of the magnetron is because the capacitors in the circuit cannot effectively ballast the perturbation from the arc discharge on the voltage applied to the magnetron. This disruption could be avoided by using two separate transformers. However, since the arc discharge pulse is much shorter than the microwave pulse, this disruption does not significantly degrade the performance of the magnetron. Under the influence of arc discharge, the microwave pulse (inferred by the input power of the magnetron shown in FIG. 11) becomes shorter but the power becomes higher.

The cycle energies of the arc discharge and magnetron input as function of the gas flow rate f are presented in FIG. 12. As shown, the effect of the gas flow saturates at a rate exceeding 0.393 l/s. In that flow rate regime, the cycle energy of the torch plasma reaches the maximum of about 12 J (assuming that magnetron has 50% conversion efficiency).

§ 4.3.2 Operation of an Exemplary System Including Two or More Microwave Plasma Torches The two-torch system with the embodiment described in § 4.2.2 utilizes a single microwave source. The arc discharges in the two torch modules are synchronized with the same microwave pulse in the operation. Thus two separate power supplies may be used in this system. One may be identical to the one shown in FIG. 4, which runs the magnetron and one of the two torch modules. The other torch module may be run by a separate power supply. The same 60 Hz power line synchronizes the output voltages of two power supplies. Since the arc discharges do not affect each other, the electrical characteristics of each torch module are similar to that presented in FIGS. 10 and 11. The microwave power used to generate the two microwave torches shown in FIG. 7B is provided by two magnetron outputs combined by a microwave combiner (Magic Tee).

§ 4.4 Conclusions

By combining a plasma torch with a microwave generator, an arc plasma torch may be used to seed a microwave discharge to produce a large, high density, plasma torch, without requiring gas flow.

Without seeding, the moderate microwave power of the magnetron (e.g., ~700 W) would be too low to initiate microwave discharge by itself in a low Q cavity. Therefore, the present invention has the advantage of triggering microwave discharge and producing a large high density plasma discharge (torch) using a low Q cavity at a moderate microwave power level.

Such a new hybrid arc/microwave plasma torch, may be constructed from parts of commercially available microwave ovens, spark plugs, and a tapered cavity. The size of the torch is nearly doubled by doubling the diameter of this opening from that of the torch module. This hybrid arc/microwave plasma torch has a peak plasma density exceeding $10^{13}$ electrons/$cm^3$ and can achieve a volume of approximately 20 cc without applying a very large airflow.

What is claimed is:

1. An apparatus for generating at least one hybrid arc/microwave plasma discharge, the apparatus comprising:

a) a cavity adapted to support at least one of a TE mode and a TM mode at a microwave frequency;

b) an arc torch module, coupled with the cavity, for generating seed plasma within the cavity; and c) a microwave source, coupled with the cavity, for generating microwaves at the microwave frequency, and for introducing the generated microwaves into the cavity, wherein the arc torch module is capable of generating a plasma torch which exits the cavity in the absence of microwave energy, said generated plasma torch having a first energy level.

2. The apparatus of claim 1, wherein the cavity is a tapered cavity.

3. The apparatus of claim 1, wherein the seed plasma generated by the arc torch module discharge triggers microwave discharge in the cavity thereby generating additional plasma.

4. The apparatus of claim 3 wherein an exit opening is defined in the cavity at a location opposite the arc torch module, wherein plasma is generated by a combination of an arc discharge and microwave discharge, and wherein the generated plasma exits the cavity through the exit opening as the hybrid arc/microwave discharge.

5. The apparatus of claim 1, wherein said cavity has a narrow section, a wide section, and a tapered section arranged between the narrow and wide sections.

6. The apparatus of claim 1, further comprising at least one additional torch module coupled with the cavity, wherein the seed plasma generated by the arc discharges of the torch modules is energized by a TE mode electric field rather that by a TM mode, the seed plasma triggering subsequent microwave discharges thereby generating at least two hybrid arc/microwave plasma discharges.

7. The apparatus of claim 6, wherein, said cavity includes a first wall and a second wall opposing the first wall, wherein the torch modules are fitted into the first wall of the cavity, and wherein exit openings are defined in the second wall of the cavity at a location opposed to the location of the torch modules, wherein said cavity includes endwalls substantially orthogonal to the first and second walls, and wherein the hybrid arc/microwave plasma discharges exit the cavity from the two exit holes of the second wall.

8. The apparatus of claim 1, wherein said torch module includes a frame, a central electrode, and a ceramic insulator, the frame including an outer electrode which is electrically connected to the cavity, the ceramic insulator insulating the central electrode from the frame of the module and from the cavity.

9. The apparatus of claim 8, wherein said torch module frame includes openings to couple inlet gas into a gas chamber of said torch module.

10. The apparatus of claim 1, wherein the hybrid arc/microwave plasma discharge forms a column, said column reaching a height of about 6 cm and a diameter of about 2 cm.

11. The apparatus of claim 10, wherein said cavity is a low Q cavity with a value less then 30, and wherein said microwave source is operated at an output energy level resulting in microwave energy levels within said cavity being below breakdown threshold in the absence of seed plasma.

12. The apparatus of claim 1, wherein in the presence of microwave energy, the apparatus generates a plasma torch which exits the cavity, said generated plasma torch having a second energy level, said second energy level being greater than said first energy level.

13. The apparatus of claim 1, wherein said apparatus is operable without cooling fluid.

14. The apparatus of claim 1, wherein the apparatus is operable without a vacuum chamber.

15. The apparatus of claim 1, wherein said arc torch module is powered by an electrical non-microwave source and wherein said arc torch module generates an electrical arc resulting in generated seed plasma used to seed a microwave discharge to produce a high density plasma torch.

16. The apparatus of claim 1, wherein the cavity is open to atmospheric conditions.

17. The apparatus of claim 1, wherein a hybrid arc microwave plasma discharge is generated independent of whether or not a pressurized gas flow is present.

18. The apparatus of claim 1, wherein a hybrid arc microwave plasma discharge is generated independent of whether or not the combination of the microwave source output power level and Q of the cavity supports the generation of plasma from microwave energy without the introduction of seed plasma.

19. The apparatus of claim 1, wherein a hybrid arc microwave plasma discharge is generated independent of whether or not the microwave source operates at an output energy level sufficient to reach a breakdown threshold and produce plasma without the introduction of seed plasma.

20. The apparatus of claim 1 further comprising:

d) synchronization circuitry to keep arc discharge in synchronization with microwave discharge in each cycle.

21. The apparatus of claim 1, wherein the apparatus is portable.

22. The apparatus of claim 1, wherein said microwave source and said arc torch module are directly coupled to said cavity.

23. The apparatus of claim 1, wherein plasma is produced in an open environment.

24. The apparatus of claim 1, wherein the plasma is directed in the absence of a confining tube.

25. The apparatus of claim 1, wherein said apparatus is operable in the absence of a stub tuner or mode conversion device to achieve microwave coupling to a degree sufficient to produce microwave based plasma discharge.

26. An apparatus for generating at least one hybrid arc/microwave plasma discharge, the apparatus comprising:

a) a cavity adapted to support at least one of a TE mode and a TM mode at a microwave frequency wherein, said cavity includes a first wall and a second wall opposing the first wall, wherein the torch module is fitted into the first wall of the cavity, and wherein an exit opening is defined in the second wall of the cavity at a location opposed to the location of the torch module; and b) a torch module, coupled with the cavity, for generating seed plasma within the cavity.

27. The apparatus of claim 26, wherein said cavity includes endwalls substantially orthogonal to the first and second wall, and additional walls arranged between the endwalls and including the first and second walls, wherein the hybrid arc/microwave plasma discharge exits the cavity from the exit opening of the second wall.

28. The apparatus of claim 27, wherein said cavity has a narrow section, a wide section, and a tapered section arranged between the narrow and wide sections, where said cavity includes a narrow section defined by the additional walls, the narrow section having a height of about 5 mm, a first of the additional walls having a first opening defined therein at which the torch module is fixed, a second of the additional walls having a second opening defined therein, wherein the second opening permits the hybrid arc/microwave plasma torch to exit, and wherein the first and second openings are located at one of the electric field maximum locations of the $TE_{10n}$ mode, and the tapered section including two end locations, the end locations of the taper section located at electric field minimum locations of said $TE_{10n}$ mode.

29. An apparatus for generating at least one hybrid arc/microwave plasma discharge, the apparatus comprising:

a) a cavity adapted to support at least one of a TE mode and a TM mode at a microwave frequency, wherein said cavity has a narrow section, a wide section, and a tapered section arranged between the narrow and wide sections and wherein both the narrow section and the wide section have rectangular cross sections; and b) a torch module, coupled with the cavity, for generating seed plasma within the cavity.

30. The apparatus of claim 29, wherein the cavity is dimensioned to support a $TE_{10n}$ mode at the microwave source frequency, wherein n is an integer that is at least 3.

31. An apparatus for generating at least one hybrid arc/microwave plasma discharge, the apparatus comprising:

a) a cavity adapted to support at least one of a TE mode and a TM mode at a microwave frequency, wherein said cavity has a narrow section, a wide section, and a tapered section arranged between the narrow and wide sections, and wherein the narrow section has a length of about $m\lambda_z/2$, where $\lambda_z$ is the wavelength of said $TE_{10n}$ mode in the axial direction of the cavity, and m is an integer determined by the number of torches to be hosted in said cavity; and b) a torch module, coupled with the cavity, for generating seed plasma within the cavity.

32. An apparatus for generating at least one hybrid arc/microwave plasma discharge, the apparatus comprising:

a) a cavity adapted to support at least one of a TE mode and a TM mode at a microwave frequency, wherein said cavity has a narrow section, a wide section, and a tapered section arranged between the narrow and wide sections; and b) a torch module, coupled with the cavity, for generating seed plasma within the cavity, wherein said cavity is a low Q cavity with a value less than 30, wherein said torch module generates seeding plasma generating additional plasma without requiring microwave breakdown, and wherein said cavity includes an exit opening to exit the hybrid arc/microwave plasma discharge, said exit opening having a larger diameter than would be possible if said torch module did not generate seeding plasma, said larger diameter exit opening resulting in a increase in the size of the plasma discharge.

33. An apparatus for generating at least one hybrid arc/microwave plasma discharge, the apparatus comprising:

a) a cavity adapted to support at least one of a TE mode and a TM mode at a microwave frequency;

b) a torch module, coupled with the cavity, for generating seed plasma within the cavity;

c) a microwave source, coupled with the cavity, for generating microwaves at the microwave frequency, and for introducing the generated microwaves into the cavity;

d) a first power supply module to power the microwave source; and e) a second power supply module to power the torch module, wherein the first and second power supply modules share a common transformer, and wherein primary input power is selected from at least one of a 60 Hz, 50 Hz, and 400 Hz AC primary power source, wherein the time average power of approximately 700 W is supplied by said first power supply module, and wherein hybrid arc/microwave discharge has a cycle energy of approximately 12 J/cycle.

34. An apparatus for generating at least one hybrid arc/microwave plasma discharge, the apparatus comprising:

a) a cavity adapted to support at least one of a TE mode and a TM mode at a microwave frequency;

b) a torch module, coupled with the cavity, for generating seed plasma within the cavity;

c) a microwave source, coupled with the cavity, for generating microwaves at the microwave frequency, and for introducing the generated microwaves into the cavity;

d) a first power supply module to power the microwave source; and e) a second power supply module to power the torch module, wherein the first and second power supply modules share a common transformer, and wherein, the first power supply module includes a coupling capacitor of approximately 1 micro-Farad, wherein the second power supply includes a coupling capacitor of 1 micro-Farad and a limiting resistor of approximately 750 ohms, and wherein the common transformer has a turns ratio of approximately 1:25.

35. An apparatus for generating at least one hybrid arc/microwave plasma discharge, the apparatus comprising:

a) a cavity adapted to support at least one of a TE mode and a TM mode at a microwave frequency, wherein the cavity is dimensioned to support a $TE_{10n}$ mode at the microwave source frequency, where n=3, wherein the microwave frequency is approximately 2.45 GHz, and wherein the cavity includes a first section, a second section, and a third section, said first section having the dimensions of a S-band WR-284 waveguide of approximately 7.2 cm×3.4 cm and a length of approximately 8.74 cm, said third section having the dimensions of approximately 7.2 cm×0.5 cm and a length of approximately 11.65 cm, said second section being a middle section, being tapered, having a width of approximately 7.2 cm, a height ranging from approximately 3.4 cm to approximately 0.5 cm, a length of approximately 11.65 cm and a slope angle of approximately 14 degrees;

b) a torch module, coupled with the cavity, for generating seed plasma within the cavity; and c) a microwave source, coupled with the cavity, for generating microwaves at the microwave frequency, and for introducing the generated microwaves into the cavity.

36. An apparatus for supporting generation of at least one hybrid arc/microwave plasma discharge, the apparatus comprising:

a) a cavity supporting at least one of a TE mode and a TM mode at a microwave frequency;

b) means for coupling at least one arc torch module to said cavity; and c) means for a plasma torch to exit the cavity, wherein said means for coupling at least one arc torch module to said cavity is on a first wall of the cavity, wherein said means for a plasma source to exit the cavity is located on a second wall of the cavity, wherein said first and second walls are different, and wherein said first and second walls are substantially planar.

37. The apparatus of claim 36, wherein the means for coupling at least one torch module include a threaded portion attached to a wall of said cavity.

38. The apparatus of claim 36, wherein the dimensions of the cavity support a $TE_{10n}$ mode at the microwave source frequency, where n is an integer of at least 3.

39. The apparatus of claim 38, wherein an implemented combination of the microwave source output power level and cavity Q is insufficient to generate plasma from the microwave energy without an introduction of seed plasma.

40. The apparatus of claim 36, further comprising:

c) means for coupling at least one additional torch module to said cavity, wherein said torch plasma is energized by a TE mode electric field rather that by a TM mode, and wherein at least two hybrid arc/microwave plasma discharges are generated.

41. The apparatus of claim 36, wherein said cavity has a narrow section, a wide section, and a tapered section arranged between the narrow and wide sections.

42. An apparatus for supporting generation of at least one hybrid arc/microwave plasma discharge, the apparatus comprising:

a) a cavity supporting at least one of a TE mode and a TM mode at a microwave frequency; and b) means for coupling at least one torch module to said cavity, wherein, said cavity includes a first wall and a second wall opposing the first wall, wherein the means for coupling is provided on the first wall of the cavity, and wherein an exit opening is defined in the second wall of the cavity at a location opposed to the location of the means for coupling.

43. The apparatus of claim 42, wherein said cavity includes endwalls substantially orthogonal to the first and second walls, wherein torch plasma forming the hybrid arc/microwave plasma discharge exits the cavity from the exit opening of the second wall.

44. The apparatus of claim 43, wherein said cavity has a narrow section, a wide section, and a tapered section arranged between the narrow and wide sections, wherein said cavity includes a narrow section defined by the additional walls, the narrow section having a height of about 5 mm, a first of the additional walls having a first opening defined therein at which the torch module is fixed, a second of the additional walls having a second opening defined therein, wherein the second opening permits the hybrid arc/microwave plasma discharge to exit, and wherein the first and second openings are located at one of the electric field maximum locations of the $TE_{10n}$ mode, and the tapered section including two end locations, the end locations of the taper section located at electric field minimum locations of said $TE_{10n}$ mode.

45. An apparatus for supporting generation of at least one hybrid arc/microwave plasma discharge, the apparatus comprising:

a) a cavity supporting at least one of a TE mode and a TM mode at a microwave frequency; and b) means for coupling at least one torch module to said cavity, wherein said cavity has a narrow section, a wide section, and a tapered section arranged between the narrow and wide sections, and wherein both the narrow section and the wide section have rectangular cross sections.

46. The apparatus of claim 45, wherein the cavity is dimensioned to support a $TE_{10n}$ mode at the microwave source frequency, wherein n is an integer that is at least 3.

47. An apparatus for supporting generation of at least one hybrid arc/microwave plasma discharge, the apparatus comprising:

a) a cavity supporting at least one of a TE mode and a TM mode at a microwave frequency; and b) means for coupling at least one torch module to said cavity, wherein said cavity has a narrow section, a wide section, and a tapered section arranged between the narrow and wide sections, and wherein the narrow section has a length of about $m\lambda_z/2$, where $\lambda_z$ is the wavelength of said $TE_{10n}$ mode in the axial direction of the cavity, and m is an integer determined by the number of torches to be hosted in said cavity.

* * * * *